(12) United States Patent
Viaud et al.

(10) Patent No.: US 6,745,680 B2
(45) Date of Patent: Jun. 8, 2004

(54) ROUND BALER HAVING SIMPLIFIED BALE DISCHARGE STRUCTURE

(75) Inventors: Jean Viaud, Gray (FR); Philippe Lucand, Melin (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/278,210

(22) Filed: Oct. 22, 2002

(65) Prior Publication Data

US 2003/0079621 A1 May 1, 2003

(30) Foreign Application Priority Data

Oct. 30, 2001 (DE) .......................................... 101 53 539

(51) Int. Cl.[7] .............................. B30B 5/06; A01D 39/00
(52) U.S. Cl. ............................. 100/88; 56/341; 100/89
(58) Field of Search ............................... 100/76, 87, 88, 100/89, 5, 7; 56/341, 342, 343, DIG. 21; 53/118

(56) References Cited

U.S. PATENT DOCUMENTS

| | | | |
|---|---|---|---|
| 3,914,926 A | 10/1975 | Braunberger et al. | |
| 4,088,069 A | * 5/1978 | Soteropulos | ................. 100/88 |
| 4,172,354 A | 10/1979 | Vermeer et al. | |
| 4,393,764 A | 7/1983 | Viaud | |
| 4,912,918 A | 4/1990 | Jennings et al. | |
| 5,230,193 A | * 7/1993 | Underhill et al. | ............. 53/556 |
| 6,094,899 A | * 8/2000 | Viesselmann | ................. 56/341 |
| 6,332,309 B1 | 12/2001 | Rodewald | .................... 56/341 |

FOREIGN PATENT DOCUMENTS

| | | |
|---|---|---|
| DE | 198 51 470 | 5/2000 |
| EP | 0 894 428 | 4/1998 |
| FR | 2 460 099 | 1/1981 |

* cited by examiner

Primary Examiner—Allen Ostrager
Assistant Examiner—Jimmy T Nguyen

(57) ABSTRACT

A large round baler is equipped with a chassis, including an outer pair of fixed side walls, that extend rearwardly beyond a pair of inner side walls which form opposite sides of a baling chamber. In an upper region of the baler, belts or the like are supported by a plurality of fixed rotary bodies extending either between the inner or the outer side walls and a movable rotary body carried at the end of a pivotally mounted tension arm, to form a large take-up loop that becomes smaller as a run of the belts expands during growth of the bale being formed. The run of belts, which is looped about the bale being formed, is conducted over rollers carried by a vertically pivoted frame, such that when the frame is swung between a lower extreme position, which it occupies during formation of a bale to a raised position, the formed bale is deposited on the ground.

10 Claims, 3 Drawing Sheets

US 6,745,680 B2

ROUND BALER HAVING SIMPLIFIED BALE DISCHARGE STRUCTURE

FIELD OF THE INVENTION

The invention concerns a large round baler with at least one flexible, endless bale-forming arrangement that is conducted over rotary bodies with stationary axes and rotary bodies with movable axes and that generally surrounds the circumference of a baling chamber.

BACKGROUND OF THE INVENTION

The book, FMO-141B, Edition D-00, shows on page 153 a large round baler with fixed side walls between which rotating rollers on stationary axes and on rotating rollers on swingable axes are arranged over which belts can be conducted. Some of the rollers are engaged in a carrier that can be pivoted vertically. The belts also extend over rollers on a tensioning arm which is forced continuously by the force of a spring into a position in which tension is applied to the belts. The advantage of this configuration lies in the fact that the carrier with the few rollers is light and does not require large positioning forces. The disadvantage, however, is that the carrier must be raised by a considerable distance so that the completed cylindrical bale can be ejected, particularly since a second set of belts is provided in the region of the ground, on which the cylindrical bale rests during its formation. When the cylindrical bale is ejected, the tension in the belts is reduced so that the ejection movement of the cylindrical bale cannot be supported.

The prospectus, VERMEER 504 HE, no publication date, shows a large round baler, in which the pivot point of a carrier extending outside the baling chamber, is located almost in the region of the center of the baling chamber. At the outer end region of the carrier, an arm is provided on which several rollers are located, over which belts are conducted and that can penetrate into the baling chamber. In this case, the tensioning arrangement forms several loops in which harvested crop can collect.

DE-A1-198 51 470 discloses a large round baler with only a single set of belts that are conducted over rollers on stationary axes and rollers on axes that can be moved in their positions in a fixed housing and in a housing component that can be pivoted. A tensioning arm is also provided that conducts the belts over two adjustable rollers. The disadvantage of this configuration consists of its limited arrangement, that results from the use of two tensioning rollers and that leads to several loops in the bale-forming arrangement during the baling operation, in which crop to be baled can accumulate and lead to jams.

The problem underlying the invention is seen in the need to propose a compact large round baler with a tensioning mechanism that maintains tension on the bale-forming arrangement and avoids jams.

SUMMARY OF THE INVENTION

This problem is solved according to the invention by the teaching of patent claim 1, where the further patent claims cite characteristics that further develop the solution to great advantage.

The arrangement of two adjacent rotary bodies on the carrier, between which the bale-forming arrangement extends, has the advantage that the bale-forming arrangement is in contact at one time with the one rotary body and at another time with the other rotary body depending on the position of the carrier. In this way, a further loop can be formed by means of the carrier that shortens the bale-forming arrangement and thereby maintains the tension. However, this loop is formed only during the raising of the carrier and does not give occasion for an accumulation of stray crop during the baling operation. The bale-forming arrangement may be configured as a set of narrow, parallel belts, as a band or as a bar chain conveyor. The rotary bodies are regularly rollers or rolls, and they may also be configured as sprockets, particularly in the case of a bar chain conveyor. The configuration of the carrier is conceivable in many ways, for example, as a component with several planes, as a lattice work of tubes, as a correspondingly curved arm or the like.

This carrier may also be configured relatively massively, since it extends and moves outside of the side walls of the baling chamber. Since only the carrier, its rollers, and the corresponding sections of the belts are moved in order to eject the bale, but not the side walls, the positioning forces are low. The positioning paths are also short, if the carrier with its rollers and the sections of the bale-forming arrangement running over them, form the bottom of the baling chamber and the bale can fall to the ground after only a small stroke of the carrier.

A support of the carrier in bearings at least in the central region of the baling chamber, in contrast to a bearing support provided above it, has the result that the baling chamber can be opened quickly for the ejection of the bale, so that the baling operation can again be resumed very rapidly. When the carrier is raised, it can hardly touch the ejected bale, because due to its central position, its radial extent is considerably less than in the state of the art.

The positioning path of the carrier is not compromised by rotary bodies on stationary axes that are located in the end regions of the baling chamber, if these rotary bodies on stationary axes are located in a region into which the carrier with its rotary bodies intrudes only to a limited extent and if the rotary bodies provide space into which the carrier can intrude. With three rotary bodies above the baling chamber, the bale-forming arrangement can form a sufficient number of loops in order to be tensioned adequately.

The tension in the bale-forming arrangement is generated in a simple way by an arm that carries a rotary body, about which the bale-forming arrangement is conducted in a loop. The force to reposition or to retain the arm can be generated by a spring, a hydraulic or pneumatic motor or the like. If the arm and the rotary body supported in bearings on it is located above the baling chamber, it does not increase the length of the large round baler, but at most its height, which is not significant.

The one rotary body on the carrier, on the one hand, can be associated with a further rotary body offset from the first, and on the other hand, will prevent the spans of the bale-forming arrangement from touching each other. As an alternative, a rotary body of larger diameter could also be used.

A triangular configuration of the carrier provides a stable arrangement that also saves space. The configuration of the one corner region as a bearing assures a secure transmission of the forces.

If the carrier simultaneously forms the side wall of the baling chamber, this can result in a reduction of the number of parts. Instead of using tubes, struts or the like, the stiffness can be improved with ribs, flanges, folded edges or the like. The position of the rotary bodies to the side wall or the side walls does not change. If the rotary bodies with the carrier and thereby with the side walls are raised for the ejection of the cylindrical bale, any crop accumulated outside of the baling chamber is ejected from the large round baler.

If a further carrier is provided that can be pivoted, whose position is a function of the tension in the bale-forming arrangement and the force of the bale, these rotary bodies can adjust themselves in such a way that the bale is supported by several rotary bodies and thereby the surface pressure remains low. A low surface pressure results in a low resistance to movement and thereby to a low power requirement.

During the baling operation and the unloading operation, if the two rotary bodies of the carrier that perform a deflection of the bale-forming arrangement are located at the same distance or essentially the same distance from a rotary body with a stationary axis, then at one time a maximum shortening of the bale-forming arrangement can be performed and at another time, a corresponding maximum lengthening of the bale-forming arrangement can be performed.

If the side walls can be repositioned relative to the chassis of the large round baler, they can be moved apart from each other for the ejection of the cylindrical bale, so that the friction forces on them can be eliminated and the bale can easily be ejected from the baling chamber.

Rotary bodies that extend outside the baling chamber, that is, extend to the side beyond it, or are at least even with the sides, and can move, if necessary, along the end edges of the side walls, are able to accommodate a movement of the side walls.

BRIEF DESCRIPTION OF THE DRAWINGS

The drawing shows an embodiment of the invention on the basis of which the invention shall be described in greater detail in the following.

DESCRIPTION OF THE DISCLOSED EMBODIMENT

Figure 1:
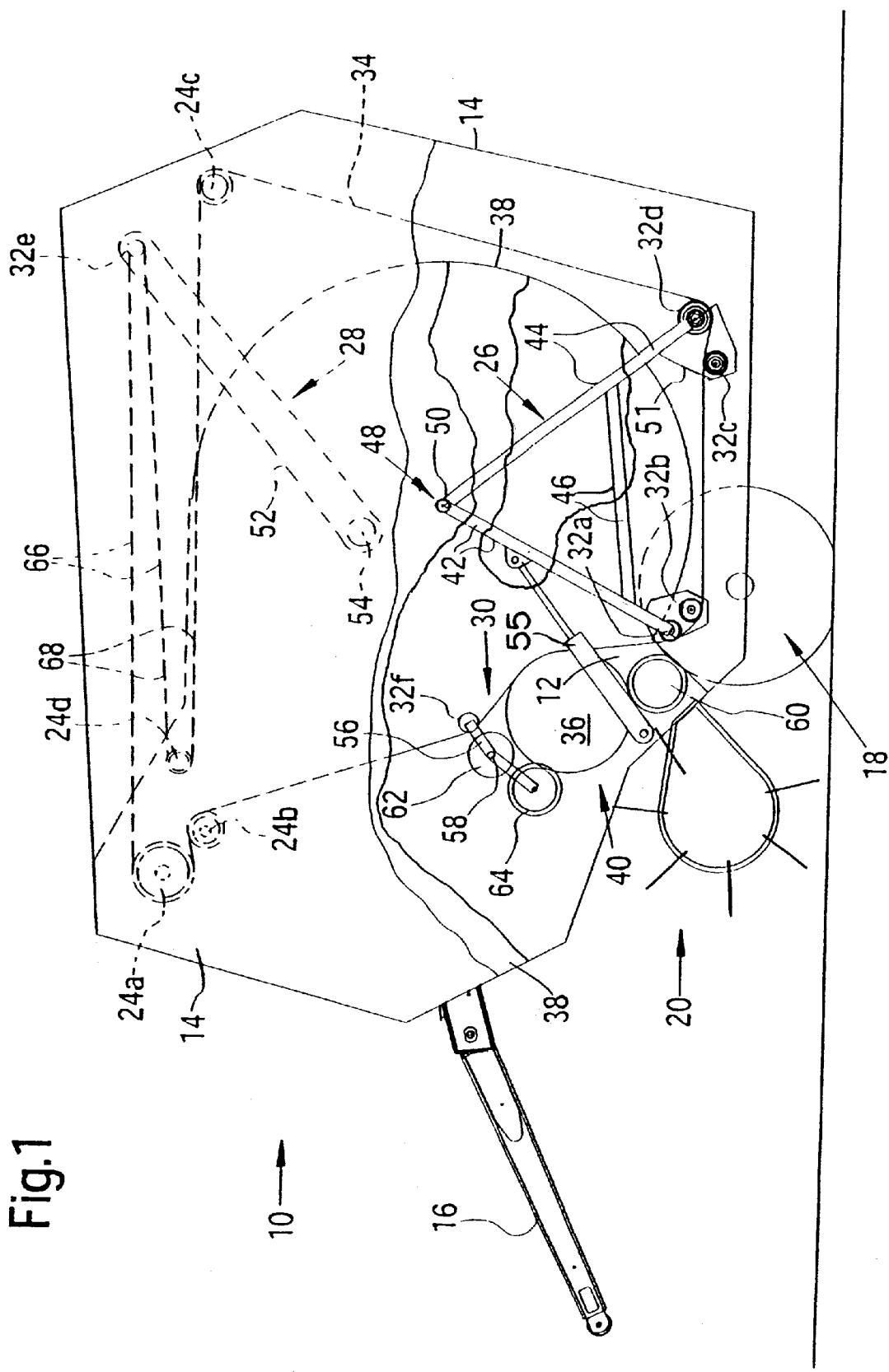
FIG. 1 is a schematic left side view of a large round baler, constructed according to the invention, shown in an operating condition where the baling chamber is only lightly filled with crop.

FIG. 1 shows an agricultural large round baler 10 with a baling chamber 12. Among other items, the large round baler 10 includes the following components: a chassis 14, a towbar 16, a running gear 18, a pick-up arrangement 20, rotary bodies on stationary axes 24a–d, a carrier 26, a tensioning mechanism 28, a pivoted carrier 30, rotary bodies 32a–f on movable axes, and a bale-forming arrangement 34.

The large round baler 10 is used to take up harvested crop, such as straw and hay, that is rolled into a spiral-shaped cylindrical bale 36, and is bound and subsequently deposited on the ground. While the bale 36 is being ejected from the baling chamber 12, the picking up of crop and the bale-forming operation is interrupted.

The baling chamber 12 is variable in its size, that is, its diameter increases with the size of the bale 36. For example, the chamber 12 and bale 36 are shown in respective small initial sizes in FIG. 1, and in respective fully-expanded, and completed sizes in FIG. 2. While the baling chamber 12 is generally surrounded around its diameter by the bale-forming arrangement 34, it is closed at its sides by opposite side walls 38. In an embodiment, not shown, a second bale-forming arrangement is provided underneath the baling chamber on which the bale 36 is either supported completely or partially.

The chassis 14 is configured in a known manner as a weldment, which holds together or carries the towbar 16, the running gear 18, the pick-up arrangement 20, a pivoting arrangement (if necessary), the rotary bodies 24a–d on stationary axes, the carrier 26, the tensioning mechanism 28, the pivoted carrier 30, and the sidewalls 38. For this purpose, transverse struts, not shown, are also provided, so that the side walls 38 remain in a rigid, spaced configuration. The configuration of the chassis 14 itself is conventional in nature.

The towbar 16 is used to connect the chassis 14 to a towing vehicle, not shown, for example, an agricultural tractor.

The running gear 18 includes, not particularly designated in each case, an axle and wheels, with which the chassis 14 is supported on the ground. The running gear 18 is connected rigidly, and if necessary, supported on springs, with the chassis 14.

The pick-up arrangement 20 is configured in conventional manner as a so-called pick-up, that takes up crop lying on the ground with circulating tines and conveys it to the rear in the direction of the baling chamber 12.

If necessary, a cutting arrangement, also of known configuration, may be provided that reduces the crop on its path between the pick-up arrangement 20 and an inlet 40 in the baling chamber 12. Indeed, such a cutting arrangement is not a necessary component of the large round baler 10; rather, it can be completely eliminated, so that the pick-up arrangement 20 directly conveys the crop into the baling chamber 12.

Figure 2:
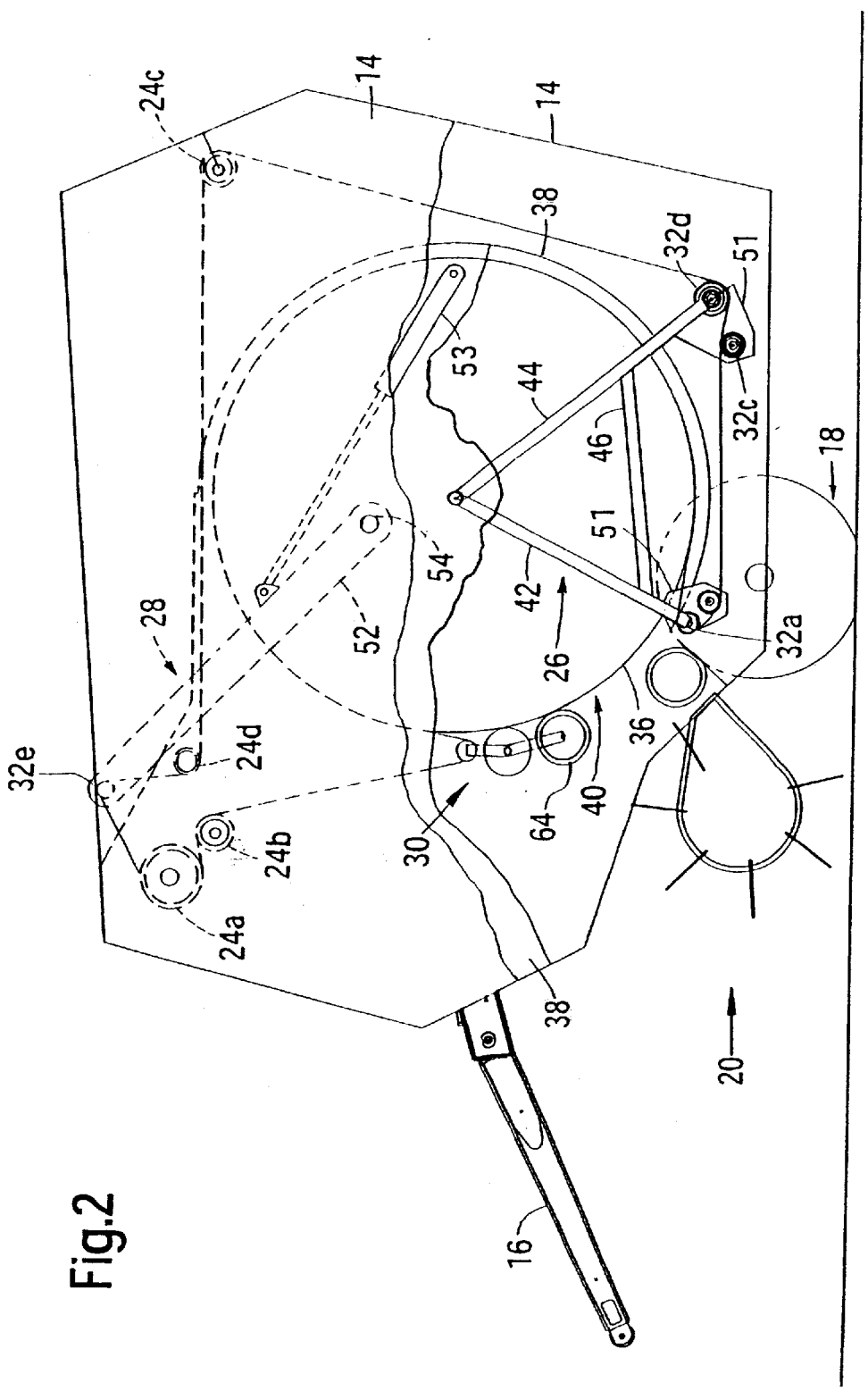
FIG. 2 shows the large round baler according to FIG. 1, but in a filled condition.

The rotary bodies 24a–d on stationary axes are configured as rollers or rolls of steel, and if necessary, coated with plastic. The rotary bodies 24a–d are either supported in bearing on an axle, free to rotate, or are provided with stub shafts that engage bearings, free to rotate, in the chassis 14. The rotary bodies 24a–d are of differing diameters and are provided, if necessary, with guide devices for the bale-forming arrangement 34, such as ribs, projections or the like. In this special embodiment, the four rotary bodies 24a–d on stationary axes are respectively located as front upper, front lower, rear upper, and intervening rotary bodies. The rotary bodies 24a–d each extend at least over the entire width of the baling chamber 12, and if necessary, beyond that. At least one of the rotary bodies 24a–d can be driven. All four rotary bodies 24a–d are located near a generally horizontal plane and above the largest extent of the baling chamber 12. Furthermore, the forward and the intervening rotary bodies, 24a, 24b, and 24d, are located ahead of an upper, front quadrant of the baling chamber 12 when the chamber is completely filled, as shown in FIG. 2. The rear rotary body 24c is located behind the baling chamber 12 at an elevation approximately equal to that of the section of the side walls 38 that is adjacent the upper rear quadrant of the filled baling chamber 12. Thus, the rear rotary body 24c is located in the upper rear region of the chassis 14 and is approximately equidistant from the rotary bodies 32c, 32d, when the carrier 26 is located in one of its end positions.

Figure 3:
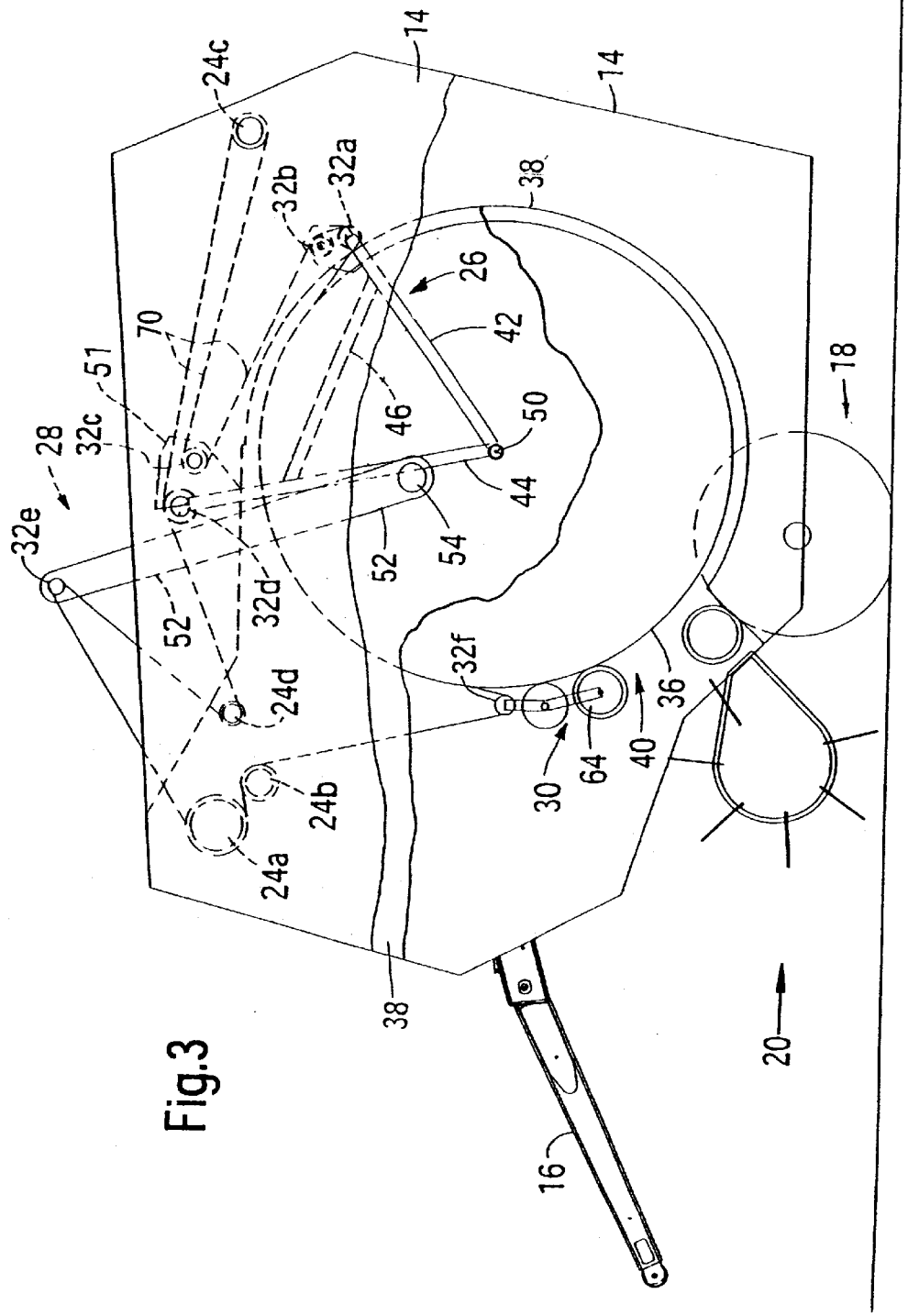
FIG. 3 shows the large round baler in a filled condition like that of FIG. 2, but with the baling chamber in a condition for unloading the completed bale.

Generally, the carrier 26 is configured in the form of a pair of triangles, each, as considered in the lowered working position of the carrier 26 shown in FIG. 1, having front and rear legs 42 and 44, respectively, that are rigidly connected to each other by a rod 46. The legs 42 and 44, respectively, of each triangle are joined at a bearing 48, which engages a bearing component 50 mounted to the exterior of an associated one of the side walls 38, from which the legs 42 and 44 extend in divergent relationship to each other. The bearing component 50 is located directly in, or close to, the center of the baling chamber 12 or the side wall 38, as considered when the chamber 12 is fully expanded. Thus, the carrier 26 includes the bearing components 50 provided in each case on the outside of the associated side wall 38. Extending between radially outer end regions of the legs 42 of the pair of triangles are the rotary bodies 32a and 32b, and extending between the radially outer end regions of the legs 44 of the pair of triangles, are rotary bodies 32c and 32d, respectively, the rotary bodies 32a–d all being mounted to the carrier 26 for free rotation. The rotary bodies 32a and 32b, respectively, extend on parallel axes spaced a small distance from each other. Similarly, the rotary bodies 32c and 32d, respectively, extend on parallel axes a small distance from each other. The rotary body 32a is attached directly to the front legs 42 of each triangle and the rotary body 32d is attached directly to the rear legs 44, while the rotary body 32b is attached to an arm or plate 51 fixed to the leg 42 of each triangle, and the rotary body 32c is attached to an arm or plate 51 fixed to the leg 44 of each triangle. The rotary body 32b carried by the front legs 42 is located radially further outward than the rotary body 32a. The repositioning of the carrier 26 is performed by a servo motor, here shown (FIGS. 1 and 3 only) as a hydraulic cylinder 55 coupled between each inner side wall 38 and the leg 42 of the adjacent triangular frame. Other servo motors may be used, for example, a rotating hydraulic motor with a gearbox, an electric or pneumatic motor or the like. The carrier 26 can be pivoted between two end positions, that is, a lower position in which the rotary bodies 32a through 32d are located generally close to a horizontal plane underneath the fully expanded baling chamber 12, with the rotary body 32a forming a lower border or bound of the inlet 24, and a position indexed through nearly 180° upward in which the rotary bodies 32c, 32d of the second leg 44 come to lie between the intervening rotary body 24d and the rear rotary body 24c, as shown in FIG. 3. The rotary bodies 32a through 32d are configured similarly to the rotary bodies 24, and also extend at least over the width of the baling chamber 12. Instead of being configured as lattice work, the carrier 26 can also be configured as a component with planes, and simultaneously form a movable part of the side wall 38.

The tensioning mechanism 28 contains a tensioning arm 52, a rotary body on a movable axis 32e and a tensioning element 53, which, for the sake of clarity, is shown only in FIGS. 1 and 2. The tensioning arm 52 and the tensioning element 53 are located in each case at each side of the large round baler 10 on the outside of the side walls 38. The tensioning arm 52 is supported in a bearing 54, free to pivot vertically, in the region of the side walls 38, particularly in this embodiment above and ahead of the bearing component 50, and extends to and beyond the plane about which the upper rotary bodies on stationary axes 24 are arranged. The rotary body 32e is located at the radially outer end region of the tensioning arm 52. The tensioning element 53 is configured in the usual manner as a hydraulic cylinder, as shown, but which may be a mechanical spring or a hydraulic motor, that can be moved against a possibly variable resistance. Such a resistance can be performed by a preferably variable throttle in a hydraulic circuit, as is known in itself. The magnitude of the resistance simultaneously determines the density and the maximum weight of the bale 36. The tensioning arm 52 is configured or arranged in such a way that it does not collide with the carrier 26. For example, the tensioning arms 52 are located further outward than each of the carriers 26. Preferably the tensioning arms 52 are connected with each other rigidly enough to prevent twisting in the region of the rotary body 32e and pivot together as an inverted "U".

The pivoted carrier 30 contains a frame 56 that is supported in bearings about its center section so as to pivot vertically about a pivot axis 58. At the upper end of the frame 56, an upper rotary body 32f is provided that extends parallel to a center roller 62 and a lower roller 64. The rotary body 32f and the rollers 62, 64 are supported in bearings, free to rotate, in the frame 56, where the center roller 62 extends coaxially to the pivot axis 58. The diameter of the rollers 62, 64 is larger than that of the rotary body 32f. The under sides of the upper rotary body or roller 32f, the center rotary body or roller 62 and the lower rotary body or roller 64 cooperate to form an upper border or bound of the inlet 40, when the carrier 30 is in a bale-starting position, as shown in FIG. 1. The inner surface of the rotary body 32f and that of the rollers 62, 64 extends generally along a curve that, in turn, generally follows the exterior shape of a completed bale 36. In this embodiment, the distance between the rotary body 32f and the upper roller 62 is larger than that between the two rollers 62, 64. Although it is not shown, the frame 56 can be pre-loaded into a certain position by means of a tensioning element.

The rotary bodies 32, in particular 32a through 32f, are provided with movable axes, where their position is a function of the tension in the bale-forming arrangement 34 and the position of the carrier 26. The rotary bodies 32a through 32d that are supported in bearings on the carrier 26 extend at least completely across the baling chamber 12, so that they can be moved on the outer edge of the rear part of the side walls 38 or at a distance to this.

In this embodiment, the bale-forming arrangement 34 is composed of a multitude of parallel, narrow, flat, flexible, and endless belts, as is known in itself. These endless belts of the bale-forming arrangement 34 are conducted, among others, over the rotary bodies on stationary axes and the rotary bodies on movable axes 32 and are brought into contact by means of the tensioning mechanism 28 so firmly to at least one driven rotary body on stationary axis 24, that it is assured of being carried along. As shown by the illustrations in FIGS. 1 and 2, respectively, the bale-forming arrangement 34 can assume an initial condition in which it just bridges over the inlet 40, and an end condition in which it is looped around the bale 36 in a large loop. When the baling chamber 12 is empty, the bale-forming arrangement 34 is conducted starting from the rear rotary body 24c and as seen in the clockwise direction as follows. Over the rotary body 24c, under the rotary body 32d, over the rotary body 32c, under the rotary bodies 32b and 32a, between the rotary body 32f and the upper pulley 62, over the forward lower rotary body 24b, over the forward upper rotary body 24a and around this by approximately 180°, over and around the rotary body 32e on the tensioning arm 52 by approximately 180°, over and around the rotary body 24d by approximately 180°, and then back to the rear rotary body 24c.

During its formation, the bale 36 is located in the expanding baling chamber 12 and is largely surrounded by the belts of the bale-forming arrangement 34, but it falls out of the baling chamber 12, that is, the space between the side walls 38, to the ground, as soon as the carrier 26 pivots upward with the movable rotary bodies 32a through 32d in the counterclockwise direction as seen in the drawing.

The side walls 38 correspond generally in their size and shape, at least in their respective rear regions, to the end faces of a completed bale 36 in its largest extent. The side walls 38 are preferably formed from steel sheet and may diverge slightly from front to rear and are welded at appropriate locations. Furthermore, the side walls 38 may each be supported in bearings so as to move to a limited degree transverse to the direction of operation, so that they reduce the contact force of the bale 36 on the inside of the side walls 38 so that the bale 36 can be ejected more easily and hence, more rapidly. It would, for example, already be sufficient if the side walls 38 were separated from each other by a few centimeters. This characteristic can be applied by itself and represents an innovation in itself. The side walls 38 can be configured as movable together with the carrier 26.

The inlet 40 is bordered at its upper side by the pulley 64 and at the bottom by a pulley 60. Indeed, the upper boundary could also be formed by the bale-forming arrangement 34 extending around the rotary body 32f and the lower boundary by the rotary body 32a. The inlet 40 generally represents the location at which the bale 36 is not surrounded by the bale-forming arrangement 34.

The pulley 60 is preferably driven and is provided downstream of, and borders on, the lower region of the pick-up arrangement 20. Preferably, the pulley 60 is provided with drivers, not described in any further detail, on its circumferential surface that assure a safe transport of the harvested crop between the pick-up arrangement 20 and the baling chamber 12. This pulley 60 forms the lower boundary of the inlet 40 and is located opposite the lower pulley 64 and in the immediate vicinity of the first, lower rotary body 32a on the first leg 42, when the carrier 26 is located in its lower, forward end position.

On the basis of the preceding description, the configuration and operation of the large round baler 10, according to the invention, is as follows.

As long as no crop is conducted to the large round baler 10 and the baling chamber 12 is empty, the carrier 26 is in its lower, forward end position in which the first, forward rotary body 32a on the first leg 42 is located close to the pulley 60 and the rotary bodies 32a through 32d are located close to a generally horizontal plane. The tensioning arm 52 is forced upward and to the rear so that it extends at an angle of approximately 45° to the vertical and is located such that the rotary body 32e is close to the rear, upper fixed rotary body 24c. The pivoted carrier 30 is in its furthest possible end position in the clockwise direction. Between the forward, upper rotary body 24 and the intervening rotary body 24d, the bale-forming arrangement 34 forms a first loop 66 around the rotary body 32e at the end of the tensioning arm 52. A second large loop 68 extends the rotary body 32e, at the end of the tensioning arm 52, about the intervening rotary body 24d, and then to the fixed rear rotary body 24c. In this region, therefore, three spans of the belts of the bale-forming arrangement 34 are located that are more or less parallel to each other above the baling chamber 12. Finally a section of the bale-forming arrangement 34 extends over the inner side of the rollers 60 and 64 and thereby closes the inlet 40. This condition would correspond to that shown in FIG. 1 if the bale 36 were absent.

As soon as harvested crop is conveyed over the pick-up arrangement 20 to the baling chamber 12, it will cause the baling chamber 12 to expand toward the rear, i.e., toward the rear of the chamber side walls 38, which has the result that the tensioning arm 52 begins to move forward and to shorten the first large upper loop 66. Starting with a certain diameter, the forming bale 36 will cause the span of the bale-forming arrangement 34 to act on the rotary body 32f so as to cause the carrier 30 to pivot in the counterclockwise direction. Thereby the lower pulley 64 will move rearwardly against the forming bale 36 and cause the latter to be moved away from the inlet 40 so that incoming harvested crop can easily be accepted. As the bale 36 increases in diameter, the tensioning arm 52 moves further forward, until it finally assumes its end position, illustrated in FIG. 2. While the diameter of the bale 36 increases, the carrier 26 remains in its position shown in FIGS. 1 and 2.

When the bale 36 has reached its largest diameter (see FIG. 2), the pivoted carrier 30 will have assumed its maximum position in the counterclockwise direction and the tensioning arm 52 will be in its most forward position, with the first loop 66 then having its shortest length. The lower front of the bale 36 will then rest on the pulley 60 and the adjoining first rotary body 32a. At the same time, the bale 36 is held by the tension in the bale-forming arrangement 34, out of contact with the first and the second rotary bodies 32c and 32d, and the sections of the belts running over them. If necessary, a further pulley, not shown, may be provided between the two second legs 44, on which the bale 36 can be supported. When the bale 36 has reached its maximum size, the radial offset of the first and the second rotary bodies 32a and 32b on the first leg 42, prevents the adjoining spans of the bale-forming arrangement 34 from coming into contact with each other. In this condition, the bale 36 can be bound or wrapped with foil or net, so that it does not fall apart after the exit from the baling chamber 12.

After the bale 36 has been fully formed, it can be ejected from the baling chamber 12, for which purpose the carrier 26 is pivoted to the rear and upward in the counterclockwise direction. In particular, on the basis of the connection in a joint of the carrier 26 defined at the bearings 50, in or near the center of the side walls 38, the bale 36 will fall to the ground after only a short pivoting path of the carrier 26 of, for example, approximately 9020. After a pivoting path of approximately 180°, for example, the first rotary body 32a on the first leg 42 is located so far above the ground that the large round baler 10 can be operated further in the forward direction without coming into contact with the bale 36 resting on the ground. When the carrier 26 is located in its upper end position, the bale-forming arrangement 34 forms a third loop 70 defined by a belt span which extends from the rotary body 32b to the rotary body 32c and then back to the fixed rotary body 24c, so that the section of the bale-forming arrangement 34 previously looped around the bale 36 is absorbed by this third loop 70 and the bale-forming arrangement 34 is maintained under tension. In this situation, the first and the second rotary bodies 32a and 32b are located between the intervening rotary body 24d and the rear rotary body 24c.

As soon as the bale has been rolled out of the baling chamber 12, the carrier 26 is again pivoted downward into the position shown in FIG. 1. During this movement of the carrier 26, the bale-forming arrangement 34 is again tensioned and thereby the tensioning arm 52 is again moved to the rear by the tensioning element 53.

Having described the preferred embodiment, it will become apparent that various modifications can be made without departing from the scope of the invention as defined in the accompanying claims.

What is claimed is:

1. In a large round baler including a wheel-supported chassis including a pair of transversely spaced side walls, an expansible baling chamber defined in part by at least one flexible, endless bale-forming arrangement conducted over a plurality of rotary bodies, wherein some of the plurality of rotary bodies are on stationary axes and others of the plurality of rotary bodies are on movable axes, and said at least one flexible, endless bale-forming arrangement including an expansible span supported by first and second ones of said plurality of rotary bodies respectively located on opposite sides of an inlet, wherein said first and second ones of said plurality of rotary bodies respectively define lower and upper bounds of said inlet, and wherein said inlet leads into said expansible baling chamber, the improvement comprising:

a) a carrier mounted to said chassis for pivoting about a horizontal transverse axis between a lowered baling position and a raised bale-discharge position; and b) said first one of said plurality of rotary bodies being mounted to said carrier in a position supporting one end of said expansible span of said at least one flexible, endless bale-forming arrangement at a lower side of said inlet when said carrier is in said lowered baling position, and for supporting said expansible span of said at least one flexible, endless bale-forming arrangement in a position along a path extending directly between said first and second ones of said plurality of rotary bodies and above said horizontal transverse axis to be moved to a location overlying an upper region of said baling chamber when said carrier is moved to said bale-discharge position.

2. The large round baler, as defined in claim 1, wherein said horizontal transverse axis is substantially coincident with an axis of a full-sized bale located in the baling chamber when the latter is fully-expanded.

3. The large round baler, as defined in claim 1, wherein third and fourth ones of said plurality of rotary bodies are respectively mounted on stationary axes arranged approximately at a height equal to that of said baling chamber and at respective locations at least as far forward as a front of said baling chamber and at least as far rearward as a rear of said baling chamber; and a fifth one of said plurality of rotary bodies being mounted on said carrier in such relationship to said at least one flexible, endless bale-forming arrangement that said fifth one of said rotary bodies is positioned in a region between said third and fourth ones of said rotary bodies when said carrier is in said bale-discharge position and supports said at least one flexible, endless bale-forming arrangement such that the latter extends forward directly to said fifth one, from said fourth one, of said rotary bodies.

4. The large round baler, as defined in claim 3, and further including a tensioning mechanism including a pair of tensioning arms respectively pivotally mounted at each side of the baler for swinging vertically; a sixth one of said plurality of rotary bodies extending between, and being mounted to, outer ends of said pair of tensioning arms; a tensioning element being mounted between said chassis and each of said pair of tensioning arms and yieldably resisting forward pivoting movement of the associated tensioning arm; a seventh one of said plurality of rotary bodies being mounted on a stationary axis spaced forward of said third one of said plurality of rotary bodies in an upper region of said baler approximately at a height equal to that of said fourth one of said plurality of rotary bodies; and said pair of tensioning arms and sixth one of said plurality of rotary bodies being located such that said sixth one of said rotary bodies engages an expansible second span of said at least one flexible, endless bale-forming arrangement extending directly between said third and seventh ones of said rotary bodies and moves said second span from front to rear in said upper region of the large round baler to take up slack in said at least one endless, flexible bale-forming arrangement when said carrier is moved from said baling position to said bale-discharge position.

5. The large round baler, as defined in claim 4, wherein an eighth one of said plurality of rotary bodies is mounted on said carrier adjacent to a ninth one of said plurality of rotary bodies, with said ninth one of said plurality of rotary bodies being offset radially from said eighth one of said plurality of rotary bodies with respect to said horizontal transverse axis about which said carrier pivots.

6. The large round baler, as defined in claim 3, wherein said chassis further includes a second pair of side walls respectively spaced inward of said first-mentioned pair of side walls and defining opposite sides of said baling chamber; said carrier being configured in the form of a pair of triangles, with said triangles having first corner regions respectively supported in bearings, free to pivot, to respective outside locations of said second pair of side walls, and having second corner regions between which extends said first one of said plurality of rotary bodies; and said fourth one of said plurality of rotary bodies being located rearward of said second pair of side walls at a radius from said horizontal transverse axis that is greater than a radius from said axis to said first one of said plurality of rotary bodies; and said first one of said plurality of rotary bodies being located approximately on a radius extending from said horizontal transverse axis to said fourth one of said plurality of rotary bodies when said carrier is in said bale-discharge position.

7. The large round baler, as defined in claim 1, wherein a second carrier is mounted for pivoting about a second horizontal axis spaced forward of the pivotal axis of said first-mentioned carrier on an opposite side of said inlet from said first one of said plurality of rotary bodies; and said second one of said plurality of rotary bodies being mounted on said second carrier at a location spaced from said second horizontal axis.

8. The large round baler, as defined in claim 3, wherein said fifth one of said plurality of rotary bodies is located on said carrier at a location spaced rearwardly from said first one of said plurality of rotary bodies, and so as to be approximately at the same distance from said fourth rotary body in both said baling and bale-discharge positions of said carrier.

9. The larger baler, as defined in claim 1, wherein said chassis includes a second pair of side walls respectively spaced inwardly from said first-mentioned pair of side walls and serving to define opposite sides of said baling chamber; said second pair of side walls respectively including rear perimeter portions defined at a radius about said horizontal transverse axis; and said carrier including first and second sides respectively mounted to said second pair of side walls and supporting said first one of said plurality of rotary bodies at a second radius slightly greater than said first-mentioned radius.

10. The large round baler, as defined in claim 9, wherein said first and second sides of said carrier are each substantially triangular and include first, second and third corners, with said first corner of each of said first and second sides of said carrier being at said horizontal transverse axis, and with said first one of said plurality of rotary bodies extending between, and being mounted to, each of said first and second sides of said carrier at said second corner; a third one of said plurality of rotary bodies being located in adjacent, parallel relationship to said first one of said plurality of rotary bodies and being mounted to said first and second sides of said carrier at said second corner of said carrier; fourth and fifth ones of said plurality of rotary bodies being located at said third corner of said carrier; said endless, flexible bale-forming arrangement extending radially outward of said first and third ones of said plurality of rotary bodies relative to said horizontal transverse axis, and extending between said fourth and fifth ones of said plurality of rotary bodies; and said first, third, fourth and fifth ones of said plurality of rotary bodies being located so as to sweep respective paths radially beyond said rear perimeter portions of said second pair of side walls from said horizontal axis.

* * * * *